United States Patent [19]
Carpenter

[11] Patent Number: 5,720,458
[45] Date of Patent: Feb. 24, 1998

[54] VEHICLE DRINK HOLDER

[76] Inventor: F. Lee Carpenter, 8134 E. Weldon, Scottsdale, Ariz. 85251

[21] Appl. No.: 509,775

[22] Filed: Aug. 1, 1995

[51] Int. Cl.$^6$ ...................................................... B60R 7/00
[52] U.S. Cl. ................... 248/205.1; 224/275; 248/311.2; 297/188.2
[58] Field of Search ............................ 248/146, 154, 248/311.2, 500, 205.1, 313; 224/275; 297/188.2

[56] References Cited

U.S. PATENT DOCUMENTS

| | | |
|---|---|---|
| 2,640,595 | 6/1953 | Byford . |
| 2,678,682 | 5/1954 | Thomas . |
| 2,692,638 | 10/1954 | Castell . |
| 2,704,567 | 3/1955 | Anderegg . |
| 3,090,478 | 5/1963 | Stanley . |
| 3,491,976 | 1/1970 | Larson . |
| 3,814,367 | 6/1974 | Rasmussen ............... 248/311.2 |
| 4,300,709 | 11/1981 | Page, Jr. . |
| 4,678,154 | 7/1987 | McFarland ............... 248/311.2 |
| 4,801,060 | 1/1989 | Thompson . |
| 4,832,241 | 5/1989 | Radcliffe . |
| 4,938,401 | 7/1990 | Weisbrodt et al. . |
| 5,071,096 | 12/1991 | Hartman et al. . |
| 5,149,032 | 9/1992 | Jones et al. . |
| 5,154,380 | 10/1992 | Risca . |
| 5,282,598 | 2/1994 | Greene . |
| 5,361,950 | 11/1994 | Signal et al. ............... 248/311.2 X |

OTHER PUBLICATIONS

Precursor model shown to Circle K Corporation (Mar. 1994).

*Primary Examiner*—Ramon O. Ramirez
*Assistant Examiner*—Derek J. Berger
*Attorney, Agent, or Firm*—Louis J. Hoffman

[57] ABSTRACT

A drink holder is designed for placement on the passenger's seat of an automobile, within easy reach of the driver. A flat, elongated member with a sinuously cross-sectioned end holds the drink between the seat back and the seat bench. The flat member supports a cylindrical holder, in which the drink is placed a distance away from the seat back. The member is sized to locate the drink in approximately the middle of the seat, within easy reach of the driver. The member contains a flex area, which permits it to conform to the shape of the seat.

20 Claims, 3 Drawing Sheets ated only to
illustrate the general structure. Consequently, scaling and
other parameters are omitted, and no account is made of
such features as angled section 27 between arcs 25 and 26
in the specific example of FIG. 1.

VEHICLE DRINK HOLDER

FIELD OF THE INVENTION

This device relates to a portable holder designed for use in carrying a drink in a vehicle.

BACKGROUND OF THE INVENTION

While driving an enclosed vehicle, such as an automobile or truck, it is frequently the custom to sip on a drink, such as a cup of coffee, a soft drink, or the like. A variety of devices are known or commercially available to permit storage of the drink container between swigs, while resisting spillage, which is particularly a problem in view of the irregular forces caused by driving.

Known devices frequently suffer from one or more of a variety of problems, including: (1) a tendency to spill under certain circumstances; (2) the placement of the drink outside easy reach; (3) incompatibility with containers of certain shapes or sizes; (4) excessive complexity, which drives up cost; and (5) incompatibility with certain types of cars. The disclosed invention offers a better drink holder that suffers from none of those problems.

It is therefore a primary object of the invention to provide an improved drink holder suited for automobiles.

It is a further object of the invention to provide an automobile drink holder that resists spills despite vehicle motion.

It is a further object of the invention to provide an automobile drink holder that keeps the drink in easy reach of a driver.

It is a further object of the invention to provide an automobile drink holder that is compatible with a wide variety of containers and vehicles.

It is a further object of the invention to provide an automobile drink holder that is not excessively complex.

The above and other objects of the invention are achieved in a preferred embodiment of the disclosed invention comprising a drink holder designed for placement on the passenger's seat of an automobile, within easy reach of the driver. A flat, elongated member with a sinuously cross-sectioned end holds the drink between the seat back and the seat bench. The flat member supports a cylindrical holder, in which the drink is placed a distance away from the seat back. The member is sized to locate the drink in approximately the middle of the seat, within easy reach of the driver. The member contains a flex area, which permits it to conform to the shape of the seat.

Other aspects of the invention will be appreciated by those skilled in the art after reviewing the following detailed description of the invention.

BRIEF DESCRIPTION OF THE DRAWINGS

The novel features of the invention are described with particularity in the claims. The invention, together with its objects and advantages, will be better understood after referring to the following description and the accompanying figures, in which common numerals are intended to refer to common elements.

DETAILED DESCRIPTION OF THE PREFERRED EMBODIMENTS

Figure 1:
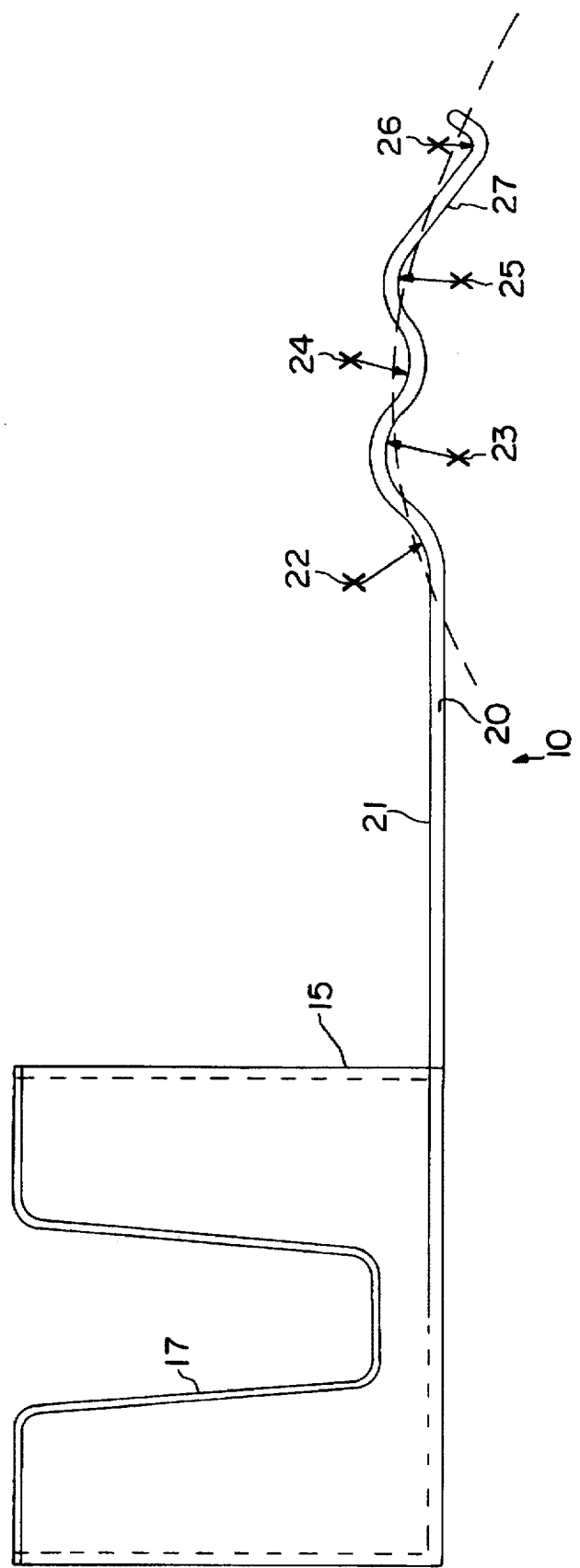
FIG. 1 is an elevation of an embodiment of the invention.

FIG. 1 shows a side view of drink holder 10. Open-topped cylinder 15 holds the cup or glass (not shown) in a generally upright position. Cylinder 15 should be large enough to hold most standard-sized drink containers and tall enough to prevent tall, narrow containers from tipping. It is not desired to use a cylinder 15 that is so tall as to prevent easy removal of a short container, such as the ubiquitous 12-oz. soft-drink can.

A slot 17 in one side of cylinder 15 permits the handle of a coffee mug or like container to extend outside the cylinder, allowing use of the drink holder with a wider variety of containers. Slot 17 terminates above the floor of cylinder 15, to retain spills of a certain quantity while still accommodating the handle. Preferably, the slit is on the side of cylinder 15 facing the driver, to facilitate ease of removal of a mug.

The floor of cylinder 15 comprises a thin plate, which extends into an elongated strip-shaped member 20 (which will be referred to herein as a "tongue"). Cylinder 15 and tongue 20 are formed of a lightweight, semiflexible material, such as molded polypropylene. A single-piece construction is preferred. The term "semi flexible," for purpose of this document, is defined below.

Tongue 20 has a flat section 21, which extends the drink away from the seat back of the vehicle, as discussed below. Promotional writing or designs can be placed on top of that area, through the molding or other manufacturing process or through the affixation of a printed label. A slight ridge (not shown) can collect small splashes.

Tongue 20 continues into a series of sinuous "waves," such as made up of a series of arcs identified by their centerpoints, numerals 22–26 in FIG. 1. In general, though, the material forming the arcs in the center of the sinuous section (such as 23, 24, and 25 in FIG. 1) are placed above the end arcs (such as 22 and 26), so that the overall structure of the waves, if smoothed, forms an arch from flat section 21 to final arc 26 (which extends below the plane of flat section 20). In other words, the sinuous section undulates relatively even above and below the arch.

Alternatively, the shape may be defined by an appropriate mathematically expressed curve. One mathematical approximation of the cross-sectional shape would be a sine wave superimposed on a parabola, such as expressed by the formula $[y=-ax2-b\cos(x)]$, where the origin is just below point 24 and "a" and "b" are positive numeric coefficients. That formula is an approximate one, intended only to illustrate the general structure. Consequently, scaling and other parameters are omitted, and no account is made of such features as angled section 27 between arcs 25 and 26 in the specific example of FIG. 1.

Figure 2:
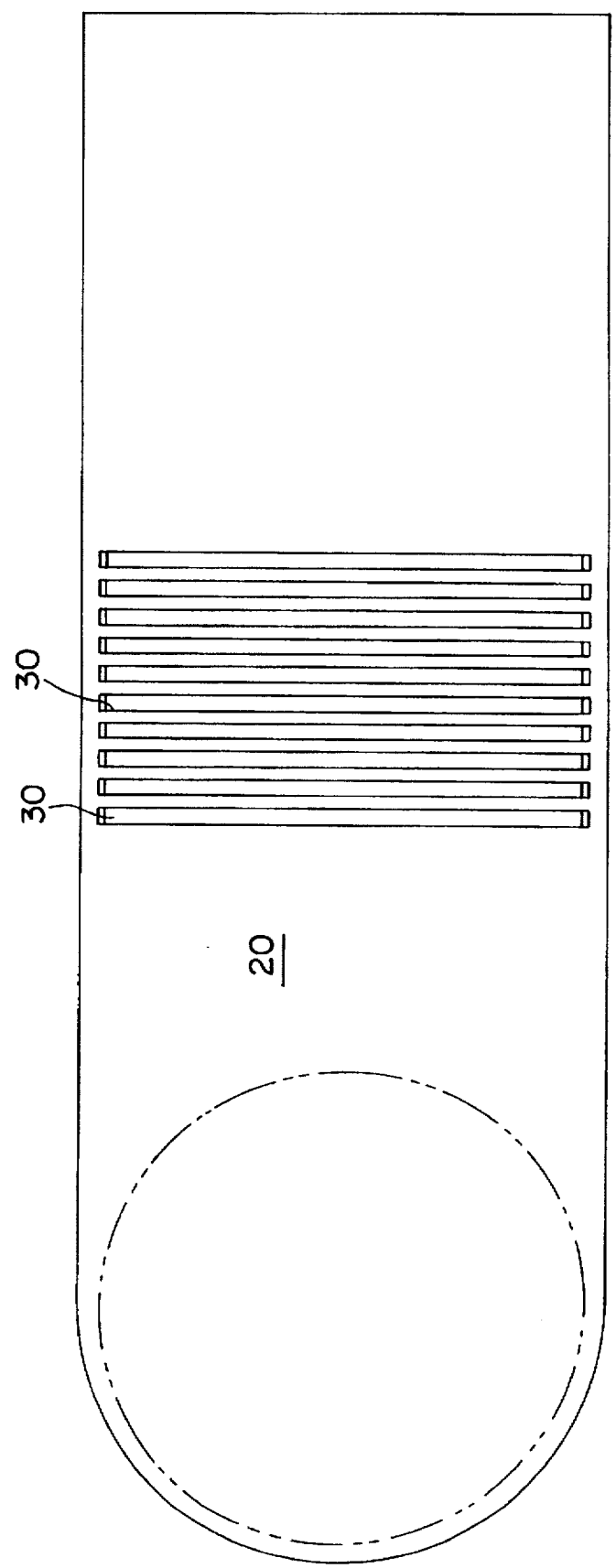
FIG. 2 is a bottom view of the embodiment of FIG. 1.

On the bottom of flat section 21, as seen in FIG. 2, a series of grooves 30 are recessed into the material. Groves 30 extend substantially but not completely across the width of tongue 20 and partially through the thickness of tongue 20.

The function of the above-described structural features will now be described:

Sinuous section 22–27 at the end of tongue 20 permits drink holder 10 to be held firmly in the seat of most automobiles and trucks. Spillage can result from the drink and drink holder together becoming loose from its moorings.

Figure 3:
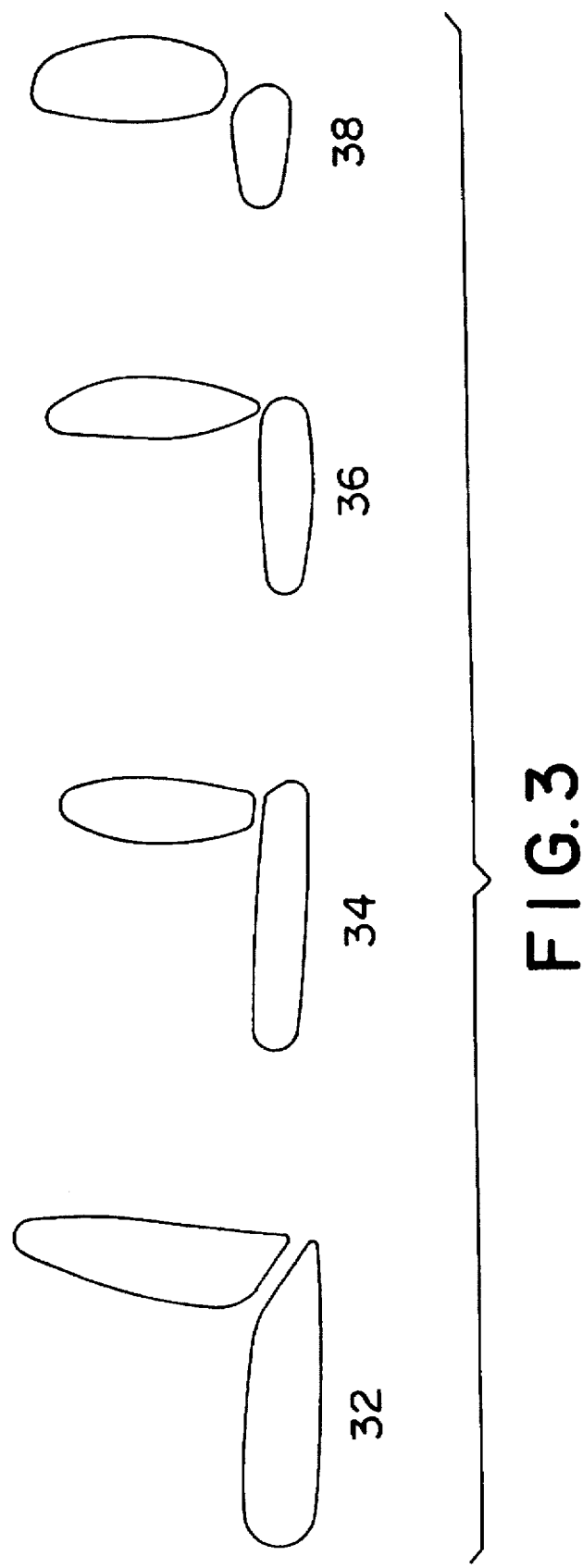
FIG. 3 is a series of cross-sectional views of various types of vehicle seats, with which the embodiment of FIGS. 1 and 2 can be used.

FIG. 3 shows a series of different types of vehicle seats, all in cross-section and all in relatively common use today. Seat 32 is a type of seat frequently used in bucket designs, in which the seat back and seat cushion oppose each other at an angle. Seat 34 is typical of a bench-type seat. Seat 36 is similar to seat 34, but with a pointy bottom to the seat back and a close spacing between the two seat parts. Seat 38 shows an example of relatively wide spacing.

The sinuous section fits each of those seats. In wide spacing, like seat 38, the arch formed by the sinuous section holds the drink holder in place. As drink holder 10 is pushed into the crack between seat parts, the top of the arch is pressed down by the seat back and the ends of the arch are pushed up by the seat bottom, holding the drink holder by compression.

With narrow spacing, like seat 36, end arc 26 hooks around the narrow end of the seat back, resisting removal of the drink holder.

In closer, bench-type spacing, like seat 34, insertion may be possible only as far as arc 25, and the downward force on 25 and upward force on 26 combine to produce a counter-clockwise torque, which presses the drink holder into the seat bottom, holding it in place.

In angled arrangements such as seat 32, angled section 27 permits insertion of at least the end of drink holder 10, the tip of arc 26 may press against the bottom of the seat back, and the horizontal force on the bottom of section 27 resists removal. Alternatively, arc 26 may hook around the back of the seat back, in a looser configuration of this sort.

In other types of seats, combinations of one or more of the forces discussed above promote retention of drink holder 10. It has been found that the sinuous cross-section shown fits the overwhelming majority of seats in existing passenger vehicle models, indeed approximately 95% of them. By contrast, known seat-insertion designs for automobile drink holders work only with a limited number of vehicle and seat types.

Exemplary dimensions (in inches) for arcs 22–26 are: Radiuses of 0.875 for 22, 0.625 for 23, 0.375 for 24, 0.5 for 25, and 0.25 for 26; horizontal distance from each of those points to the tip of arc 26:4.36 for 22, 3.19 for 23, 2.34 for 24, 1.61 for 25, and 0.33 for 26; and vertical distance above the bottom of flat portion 21:1.0 for 22, 0.07 for 23 and 25, 0.66 for 24, and –0.11 for 26. All of those dimensions are approximate and may be varied.

Aside from resisting inadvertent extraction, the drink holder must protect the drink against spillage caused by vertical motion, such as when the vehicle goes over a bump. Unlike most drink holders, which are rigidly fixed to the vehicle, the inventive design is "semiflexible," permitting additional absorbing of such shocks. Further, the drink holder is sized to locate the drink at the center of the seat, taking advantage of the cushioning effect of the seat springs.

The thinner material of grooves 30 establish a "flex area" in flat section 21 of tongue 20, permitting the drink holder to conform to the outline of the seat cushion, which also varies considerably from vehicle to vehicle. The user can bend tongue 20 firmly in the flex area, permitting a more permanent curve suited to a particular seat, but one that is not indelible. The ridges at the ends of grooves 30 maintain rigidity, preventing creasing of the plastic material of the drink holder along the grooves.

Another way in which a drink can spill is if the drink holder twists, causing the drink to spill towards one of the vehicle doors. The ridges at the end of grooves 30 resist that effect, as does the general rigidity across the width of tongue 20, as best seen in FIG. 2. Raised patterning or lettering (not shown) on the bottom of tongue 20 can provide an anti-skid surface. If additional lateral stability is necessary, horizontal extensions (not shown) can be molded from tongue 20. Such an option is not necessary in the disclosed embodiment, in view of the width of tongue 20.

Exemplary dimensions related to grooves 30 are: 0.15 inch wide, separated by a ridge of 0.1-inch width, 0.82 inch deep, leaving material 0.43 inch thick below the grooves, extending to 0.125 inch from the edge of flat section 21, and numbering 10 grooves next to each other.

A model of the preferred embodiment shown in the figures, having the exemplary dimensions listed above, was tested to characterize the degree of flexibility. In one rough experiment, a weight of approximately a pound was placed in a cup in the cupholder and the cupholder was held on a support so that the entire flex area 21 and the cylinder 15 only extended off of the end of the support while the sinuous area 22–26 was held horizontally. The weight caused the end of tongue 20 below cylinder 15 to deflect about 2.5 inches more than it did without the added weight. Put another way, the weight flexed the cupholder about 20 degrees. It was estimated that the experiment had a margin of experimental error of about 20%.

Based on that experiment, the flexural modulus of the tongue 20 through the flex area 21 was calculated. For this purpose, the "flexural modulus" is defined as the flexural rigidity divided by the length of the member, and the flexural rigidity is in turn defined as the force applied to the free end of the member divided by the distance the free end deflected. The flexural modulus was calculated for the experiment as about 370 newtons per square meter.

Flexible tongue 20 should be constructed of an appropriate material and cross-sectional structure so that the flexural modulus is approximately the same as the material in the experiment. Thus, the preferred embodiment can be modified by departing from the cross-sectional arrangement shown above or using a different material from that used in the preferred embodiment, so long as the degree of flexibility is substantially the same. For example, a completely flat material (having uniform cross-section) could be used instead of the grooved flex area shown, so long as the material was slightly stiffer than the material of the preferred embodiment.

The degree of flexibility may be varied to some extent, however, without losing the disclosed advantages of semi-flexibility. In particular, it is believed that the flexural modulus, as defined above, may be about 50 percent greater or 25 percent lesser than the preferred embodiment without losing the advantages. Those estimates would result in a range of about 275 to 550 newtons per square meter.

As noted above, however, if the cupholder is made of a material that is substantially rigid, such as many hard plastics, the drink held in cylinder 15 will not sit flat on the seat, and the cupholder will stick up into the air above the seat, which is undesired. Alternatively, if the cupholder is molded of an overly flexible material, the material will not resist twisting or bending sufficiently to prevent the drink from spilling, which is also undesired.

The diameter of cylinder 15 is large enough to hold a large tankard, such as a 44-ounce cup. The large diameter also assists in retaining a larger amount of fluid, if a spill occurs, and (particularly because tongue 20 is of equal width) promotes greater lateral stability. Nevertheless, such a large diameter (the example in FIG. 2 is a 4.1-inch inside diameter) still securely retains a small-diameter drink such as a 2.5-inch diameter, 12-ounce soft-drink can. Such a can sits at a slight angle in the cylinder, which is promoted by the fact that most car seats slope upward toward the front, causing the holder to cradle the can in the curve at the far, top rim of cylinder 15. Similarly, the bottom of such a can will sit partly on the flat bottom and partly against the bottom, inside wall at the back of cylinder 15.

The drink is positioned in the middle of the seat, avoiding the disadvantage of forcing the driver to reach back to pick up the drink. Thus, the driver can keep looking at the road, without glancing back to locate a drink placed (in prior art designs) closer to the seat back. In most vehicles, the holder can be placed in the rear seat (or intermediate seats in multi-passenger vehicles such as vans) and used by a passenger in those seats or used for temporary storage of a drink.

Although the invention has been described with reference to specific embodiments, many modifications and variations of such embodiments can be made without departing from the innovative concepts disclosed.

Thus, it is understood by those skilled in the art that alternative forms and embodiments of the invention can be devised without departing from its spirit and scope. The foregoing and all other such modifications and variations are intended to be included within the spirit and scope of the appended claims.

I claim:

1. A drink holder for a vehicle comprising:
   (a) a substantially flat tongue having two ends; and
   (b) an open-topped cylinder supported on one of the ends of the tongue, wherein the cylinder and the tongue are secured together;
   (c) wherein the other end of the tongue is formed into a generally arched, sinuous shape; and
   (d) wherein at least a portion of the tongue between the two ends is shaped and comprised of a material giving the tongue a flexural modulus between about 275 and 550 newtons per square meter.

2. The device of claim 1 wherein the tongue has a flexural modulus of approximately 370 newtons per square meter.

3. The device of claim 1 wherein the tongue has a flex area between the two ends comprising a plurality of grooves.

4. The device of claim 3 wherein the grooves extend nearly but not entirely across the width of the tongue.

5. The device of claim 3 wherein the drink holder is shaped and comprised of a material giving the tongue flexibility that, when the portion of the tongue away from the cylinder past the flex area is held in a substantially horizontal position, a weight of about one pound placed in the cylinder will cause the end of the tongue supporting the cylinder to deflect down approximately 2.5 inches.

6. The device of claim 1 wherein the cylinder and the tongue are formed of a unitary piece of molded polypropylene.

7. The device of claim 1 wherein the material of the sinuous shape comprises a series of curved surfaces that undulate relatively even above and below an arched mathematical surface.

8. The device of claim 7 wherein a cross-section of the material of the sinuous shape is approximated by the mathematical expression comprising a sinusoidal function superimposed on a parabola.

9. The device of claim 7 wherein the sinuous shape consists of the following shapes, in sequence from the flat portion of the tongue to the end of the tongue away from the cylinder, wherein the upside of the tongue refers to the side of the tongue on which the cylinder is supported:
   (a) a first curve bending the material of the tongue up;
   (b) a second curve bending the material of the tongue down;
   (c) a third curve bending the material of the tongue up;
   (d) a fourth curve bending the material of the tongue down;
   (e) a flat, downward-angled section; and
   (f) an end hook oriented substantially perpendicular to the angled section and pointing from the upside of the tongue.

10. The device of claim 1 wherein the sinuous shape terminates with an end hook pointing from the side of the tongue supporting the cylinder.

11. The device of claim 10 wherein the sinuous shape contains a flat, angled section adjacent to the end hook.

12. The device of claim 1 wherein the cylinder includes a slot in one side of the cylinder that extends from the rim of the cylinder and extends part way to the base of the cylinder.

13. A drink holder for a vehicle comprising:
   (a) a molded polypropylene structure including a tongue that is mostly substantially flat and has two ends and an open-topped cylinder supported on and formed integrally with one of its ends;
   (b) wherein the other end of the tongue is formed into a generally arched, sinuous shape comprising a series of curved surfaces that undulate relatively even above and below an arched mathematical surface, which terminates with a flat section oriented at an angle to the tongue followed by an end hook oriented substantially perpendicular to the angled section and pointing from the side of the tongue supporting the cylinder;
   (c) wherein at least a portion of the tongue between the two ends has a semiflexible flex area comprising a plurality of grooves extending nearly but not entirely across the width of the tongue; and
   (d) wherein the flex area imparts to the tongue a flexural modulus between about 275 and 550 newtons per square meter.

14. The device of claim 13 wherein the tongue has a flexural modulus of approximately 370 newtons per square meter.

15. The device of claim 14 wherein a cross-section of the material of the undulating, curved surfaces is approximated by the mathematical expression comprising a sinusoidal function superimposed on a parabola, and wherein the curved surfaces consist of the following shapes, in sequence from the flat portion of the tongue to the end of the tongue away from the cylinder, wherein the upside of the tongue refers to the side of the tongue on which the cylinder is supported:
   (a) a first curve bending the material of the tongue up;
   (b) a second curve bending the material of the tongue down;
   (c) a third curve bending the material of the tongue up; and
   (d) a fourth curve bending the material of the tongue down.

16. The device of claim 15 wherein the cylinder includes a slot in one side of the cylinder that extends from the rim of the cylinder and extends part way to the base of the cylinder.

17. A drink holder for a vehicle comprising:
   (a) a substantially flat tongue having two ends; and
   (b) an open-topped cylinder supported at one of the ends of the tongue and formed integrally with the tongue;
   (c) wherein the other end of the tongue is formed into a generally arched, sinuous shape terminating with a hook; and (d) wherein at least a portion of the tongue between the two ends has a flex area comprising a plurality of grooves extending nearly but not entirely across the width of the tongue.

18. The device of claim 17 wherein the tongue has a flexural modulus of approximately 370 newtons per square meter.

19. The device of claim 18 wherein the material of the sinuous shape comprises a series of curved surfaces that undulate relatively even above and below an arched mathematical surface, and wherein the sinuous shape consists of the following shapes, in sequence from the flat portion of the tongue to the end of the tongue away from the cylinder, wherein the upside of the tongue refers to the side of the tongue on which the cylinder is supported:

(a) a first curve bending the material of the tongue up;

(b) a second curve bending the material of the tongue down;

(c) a third curve bending the material of the tongue up;

(d) a fourth curve bending the material of the tongue down;

(e) a flat, downward-angled section; and (f) the hook, which is oriented substantially perpendicular to the angled section and points from the upside of the tongue.

20. The device of claim 17 wherein the drink holder substantially consists of the tongue and the cylinder.

* * * * *